United States Patent [19]
Mudra et al.

[11] Patent Number: 5,536,396
[45] Date of Patent: Jul. 16, 1996

[54] WATER FILTRATION KIT

[75] Inventors: Mark R. Mudra, Edina; Steven C. Morem, Golden Valley, both of Minn.

[73] Assignee: ValueDirect Filtration Systems, Inc., Minneapolis, Minn.

[21] Appl. No.: 505,971

[22] Filed: Jul. 24, 1995

[51] Int. Cl.$^6$ .................................................. B01D 24/12
[52] U.S. Cl. .............................. 210/94; 210/95; 210/232; 210/282; 210/470; 210/472; 210/474; 210/476; 210/455; 210/482
[58] Field of Search ................................... 210/282, 266, 210/283, 472, 474, 94, 95, 232, 420, 466, 476, 455, 482

[56] References Cited

U.S. PATENT DOCUMENTS

| | | | |
|---|---|---|---|
| 219,817 | 9/1879 | Jewett | 210/284 |
| 2,224,577 | 12/1940 | Shively et al. | 210/473 |
| 2,761,832 | 9/1956 | Robb et al. | 210/473 |
| 4,094,779 | 6/1978 | Behrman | 210/282 |
| 4,419,235 | 12/1983 | Sway | 210/282 |
| 4,623,457 | 11/1986 | Hankammer | 210/237 |
| 4,895,648 | 1/1990 | Hankammer | 210/188 |
| 4,936,984 | 6/1990 | Blandford et al. | 210/474 |
| 4,969,996 | 11/1990 | Hankammer | 210/282 |
| 4,986,901 | 1/1991 | Nohren, Jr. et al. | 210/282 |
| 5,049,272 | 9/1991 | Nieweg | 210/266 |
| 5,139,666 | 8/1992 | Charbonneau et al. | 210/264 |
| 5,173,192 | 12/1992 | Shalen | 210/473 |
| 5,190,643 | 3/1993 | Duncan et al. | 210/473 |
| 5,225,078 | 7/1993 | Polasky et al. | 210/282 |
| 5,238,559 | 8/1993 | Nieweg | 210/467 |

*Primary Examiner*—Cynthia L. Nessler
*Attorney, Agent, or Firm*—Haugen and Nikolai

[57] ABSTRACT

A kit for preparing batches of filtered water includes a container, a reservoir/funnel and a filter cartridge. The reservoir funnel is dimensioned to conform to a predetermined surface of the container to fit thereon during storage of the kit and the reservoir funnel further includes a tapered outlet designed to cooperate with the filler opening on the top of the container so as to be rigidly supported by the container. The funnel/reservoir includes a well into which a cartridge carrying a filter media can be inserted. The configuration is such that water poured into the funnel/reservoir must pass through the filter cartridge before entering the container.

12 Claims, 4 Drawing Sheets

WATER FILTRATION KIT

BACKGROUND OF THE INVENTION

1. Field of the Invention

This invention relates generally to home drinking water filtration equipment, and more particularly to a kit including a filtered water storage container, a replaceable water filtration cartridge and an unfiltered water reservoir having a funnel outlet for receiving the water filtration cartridge therein, the funnel outlet being insertable through a filler opening in the storage container.

2. Discussion of the Prior Art

The quality of drinking water is found to vary from community to community. While most municipal water treatment plants produce potable water, free of harmful microorganisms, the taste and/or odor quality of the drinking water may leave much to be desired. Also, drinking water from the tap may contain mineral deposits that effect quality and even harmful lead deposits. Equipment is sold today that can be plumbed into the home's water system for filtering out sub-micron particles and removing odor, but such systems tend to be costly. Filtered water may also be purchased at grocery stores and the like, but again, the cost per gallon for such, filtered water is relatively high.

In U.S. Pat. Nos. 4,623,457 and 4,895,648 to Hankammer, there is described equipment for filtering batches of drinking water and for temporarily storing the filtered water until consumed. The '457 patent specifically describes a pitcher having a handle and pouring spout where the open end of the pitcher is shaped to receive an appropriately shaped funnel whose outlet spout is dimensioned to accept a water filtration cartridge therein. Water deposited into the funnel may slowly percolate through the filter media contained in the cartridge with the filtered water then filling the pitcher. Because the funnel is designed to fit within the confines of the pitcher, it necessarily limits the volume of potable water that can be filtered and stored. That is to say, the funnel and filter take up substantially half of the volume of the pitcher, making it necessary to create batches of filtered water at more frequent intervals than might otherwise be necessary if the entire volume of the pitcher were available to contain the filtered water.

A need therefore exists for a kit that may be used to produce filtered water in reasonable volumes, but which can also be readily stored in a refrigerator without consuming an inordinate amount of refrigerator space and which may be used to readily dispense the filtered water into a drinking glass.

SUMMARY OF THE INVENTION

The problem alluded to above is solved in accordance with the present invention by providing a water filtration kit that comprises a hollow, molded, plastic container in the form of a generally rectangular parallelepiped having a top wall with a filler opening formed therein, a bottom wall and first and second parallel end and side walls extending between the top and bottom walls. The first end wall includes an integrally molded handle and a threaded outlet port disposed proximate the bottom wall. A suitable spigot valve is connected to the threaded outlet port to ease dispensing of filtered water from the container. The kit further includes a funnel member comprising a reservoir having four mutually perpendicular side walls projecting outwardly from a bottom wall to define an open top. The bottom wall includes a cylindrical well with an integrally molded, frusto-conical shaped collar surrounding the funnel's outlet opening. The collar is adapted to engage the filler opening in the top wall of the container. The kit also contains a filter cartridge containing a water filtration medium therein. One type of cartridge has a first end having an aperture formed therethrough through which water can pass to come into contact with the filter media. The first base is surrounded by an annular flange that is dimensioned to be supported by a portion of the bottom wall of the funnel member surrounding its outlet opening such that the filter cartridge is disposed within the container. When unfiltered water is run into the funnel's reservoir, it slowly percolates through the filter cartridge to fill the storage container. When the container has been filled, the funnel can be removed from the container's filler opening and then fitted over a portion of the container where it is retained until again needed when creating a subsequent batch of filtered water. The filter cartridge includes a means for indicating how many batches of water have been passed through the filter cartridge so that its replacement time can be determined.

BRIEF DESCRIPTION OF THE DRAWINGS

The foregoing features, objects and advantages of the invention, as well as others, will become apparent to those skilled in the art from the following detailed description of a preferred embodiment of the invention, especially when considered in conjunction with the accompanying drawings in which like numerals in the several views refer to corresponding parts.

DESCRIPTION OF THE PREFERRED EMBODIMENT

Figure 1:
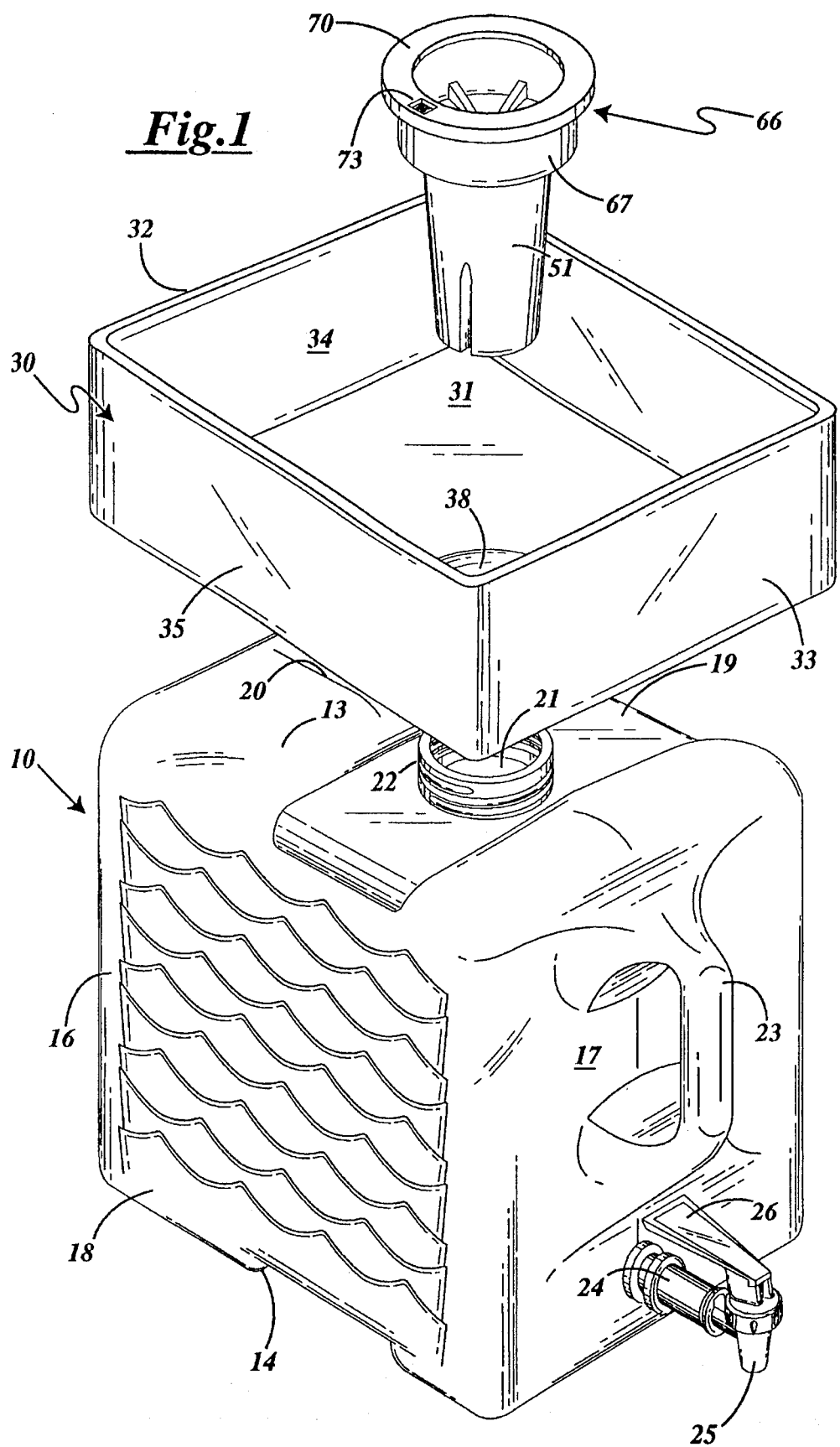
FIG. 1 is an exploded, perspective view of the water filtration kit of the present invention.

Referring first to FIG. 1, the water filtration kit of the present invention is seen to comprise three separate components, namely, a container 10 for storing and dispensing filtered water, a reservoir/funnel 30 for containing a supply of unfiltered water and a filter cartridge 50. The constructional features of each component of the kit will first be described, followed by an explanation as to how the kit is assembled for filtering a batch of water and for convenient storage of the kit when not in use.

With continued reference to FIG. 1, the container 10 is seen to comprise a molded plastic jug in the form of a rectangular parallelepiped having a top wall 13, a bottom wall 14, first and second ends 16 and 17 and mutually perpendicular side walls 18 and 19. With no limitation intended, the container 10 may be vacuum formed polyethylene, polyurethane or polyethylene tetrathalate (PET). It may be molded as two identical halves which then later may be ultrasonically bonded together along a midline 20. Formed on the top 13 of the container 10 is an opening 21 surrounded by an outwardly projecting annular collar 22 which is threaded on its exterior for receiving a screw-on cap (not shown).

Integrally molded on the second end 17 of the container is a handle member 23 to facilitate lifting and carrying of the container. Disposed immediately below the handle 23 on the second end panel 17 is a threaded tubular outlet port 24 on which is screwed a conventional spigot valve 25 having a dispensing lever 26 which, when depressed, opens the valve, allowing the water held within the container 10 to flow out by gravity. The volume of the jug is somewhat a matter of choice but a two gallon size and one gallon size are preferred for ease of handling and for storage in a refrigerator.

Figure 7:
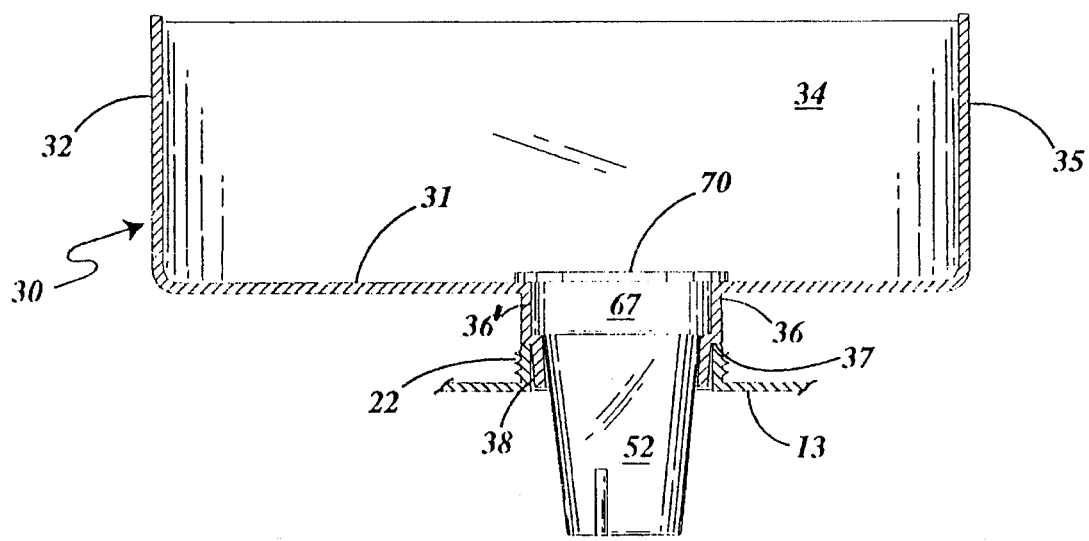
FIG. 7 is a cross-sectional view taken through the funnel component showing a filter cartridge of the embodiment of FIG. 4 disposed therein.

The funnel member 30 comprises a tray-like reservoir having a bottom 31 and four mutually perpendicular side walls 32, 33, 34 and 35 projecting upwardly therefrom to define a generally open top. As can best be seen in the cross-sectional view of FIG. 7, integrally formed in the bottom 31 is a cylindrical well 36 defined by an annular side wall 36' and a floor or bottom 37. Formed through the thickness dimension of the floor 37 is a generally circular opening that is surrounded by a downwardly depending frusto-conically shaped funnel outlet 38. The funnel outlet 38 is dimensioned such that it is able to fit within the threaded neck 22 formed in the top 13 of the container 10.

The area of the bottom 31 of the funnel/reservoir 30 and the height of its four mutually perpendicular side walls is such that the funnel/reservoir can contain approximately ½ gallon of water to be filtered.

Figure 4:
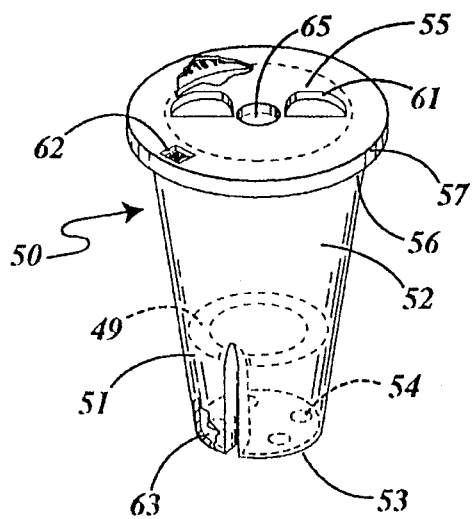
FIG. 4 is a perspective view of a first type of water filtration cartridge forming a part of the kit of FIG. 1.
Figure 5:
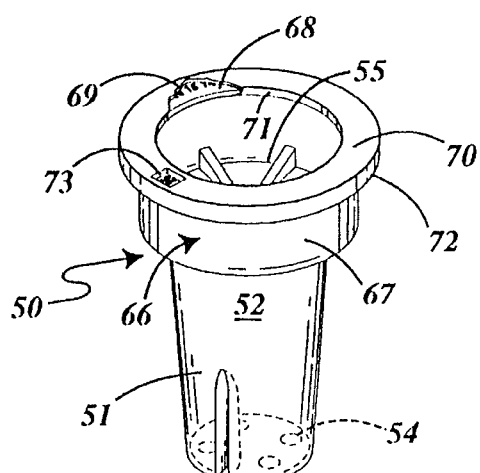
FIG. 5 is a perspective view of an alternative water filtration cartridge as a part of the kit of FIG. 1.
Figure 6:
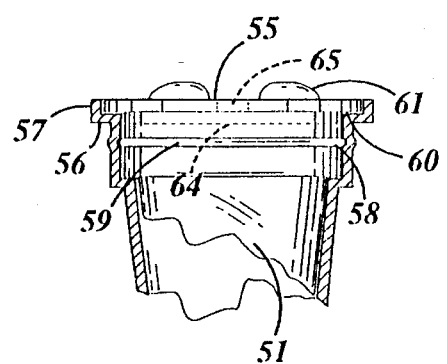
FIG. 6 is a cross-section view of the top portion of the cartridge of FIG. 4.

With reference to FIGS. 1, 4 and 5 of the drawings, the filter cartridge 50 may comprise a molded plastic cup-shaped shell 51 having a frusto-conically tapered side wall 52 and a bottom wall 53 that includes a plurality of circular openings 54 therethrough. The filter cartridge 50 further includes a top or cap 55 which is designed to snap onto the shell 51 so as to be rotatable. In this regard, reference is made to the partial cross-sectional view of FIG. 6 showing the cap 55 engaged to the upper end of the cup or shell 51. There it can be seen that the cup 51 includes an annular flange 56 formed about its upper perimeter that terminates in an upwardly projecting annular wall 57. An annular groove 58 is molded into the inner wall of the shell so as to receive a mating annular ring 59 formed on the lower base of the cap 55. The cap 55 includes an annular shoulder portion 60 adapted to rest upon the flange 56 of the cup. Thus, when a torque force is applied to the upwardly projecting ears 61 molded onto the cap, it can spin relative to the cup but is restrained from separating from the cup because of the engagement between the annular groove 58 formed in the cup and the annular bead 59 formed on the cap.

With reference to FIG. 4, a window-like opening 62 is formed through the cap 55 in the area overlaying the flange 56 so that numerical indicia molded onto the surface of the flange 56 can be viewed. By rotating the cap 55 relative to the shell 51, different numerical characters are exposed through the window 62.

The molded cup or shell 51 is designed to contain a suitable filter media such as, for example, a mixture of activated charcoal particles for removing chlorine and other contaminants and a de-ionization resin capable of removing lead from the water being treated. To preclude such particulate matter from exiting the holes 54 formed in the bottom 53 of the shell, it has been found convenient to place a thin disk of filter paper 63 (FIG. 4) atop the inside surface of the base 53. The filter paper permits water to pass through it but not the particulate filter media. Likewise, a disk of filter paper 64 (FIG. 6) may be affixed to the underside of the cap 55 to prevent egress of the particulate filter material through the water entry opening 65 formed in the cap, should the filter cartridge be inverted during shipment or the like.

To offset the "wall effect" where water tends to flow along the interface between the wall of the cup 52 and the filter media which it contains has proven effective to include a baffle 49 in the form of a flat ring about midway down the height dimension of the cup. Water flowing along the interface and striking it if diverted into the center of the cup and caused to flow through the filter media.

Instead of a particulate filter media, it is also contemplated that a carbon block filter can be contained within the shell 51 and arranged such that water entering through the inlet opening 65 will flow into a longitudinal bore formed centrally in the carbon block and then flow outwardly through the side walls of the carbon block to achieve the desired filtration.

FIG. 5 shows an alternative water filtration cartridge construction in which the assembly of FIG. 4 is inserted into and supported by a molded plastic collar assembly indicated generally by numeral 66. The collar assembly includes a generally cylindrical side wall portion 67 having a peripheral flange 68 extending radially outward therefrom. Integrally molded on the upper flat surface of the flange 68 are numerical indicia as at 69. A generally planar ring member 70 has downwardly depending sides 71 and 72 that closely engage the flange 68, but the ring 70 can be rotated so as to sequentially expose a selected one of the series of numbers 69 through a rectangular aperture or window 73 formed through the thickness dimension of the ring 70. The cup or shell assembly 50 is supported in the molded plastic collar 66 by the engagement of the flange 56 with an annular wall that extends inwardly along the lower or bottom edge of the cylindrical portion 67 of the molded plastic collar.

Referring again to FIG. 7, it can be seen that the molded cup or shell 52 is dimensioned to be insertable through the opening in the base of the frusto-conical outlet 38 of the funnel 30 and the depth of the well 36 is such that the cup-like collar 67 can be contained therein with the flange 68 beneath the rotatable ring 70 resting upon the floor 31 of the funnel/reservoir 30.

Figure 2:
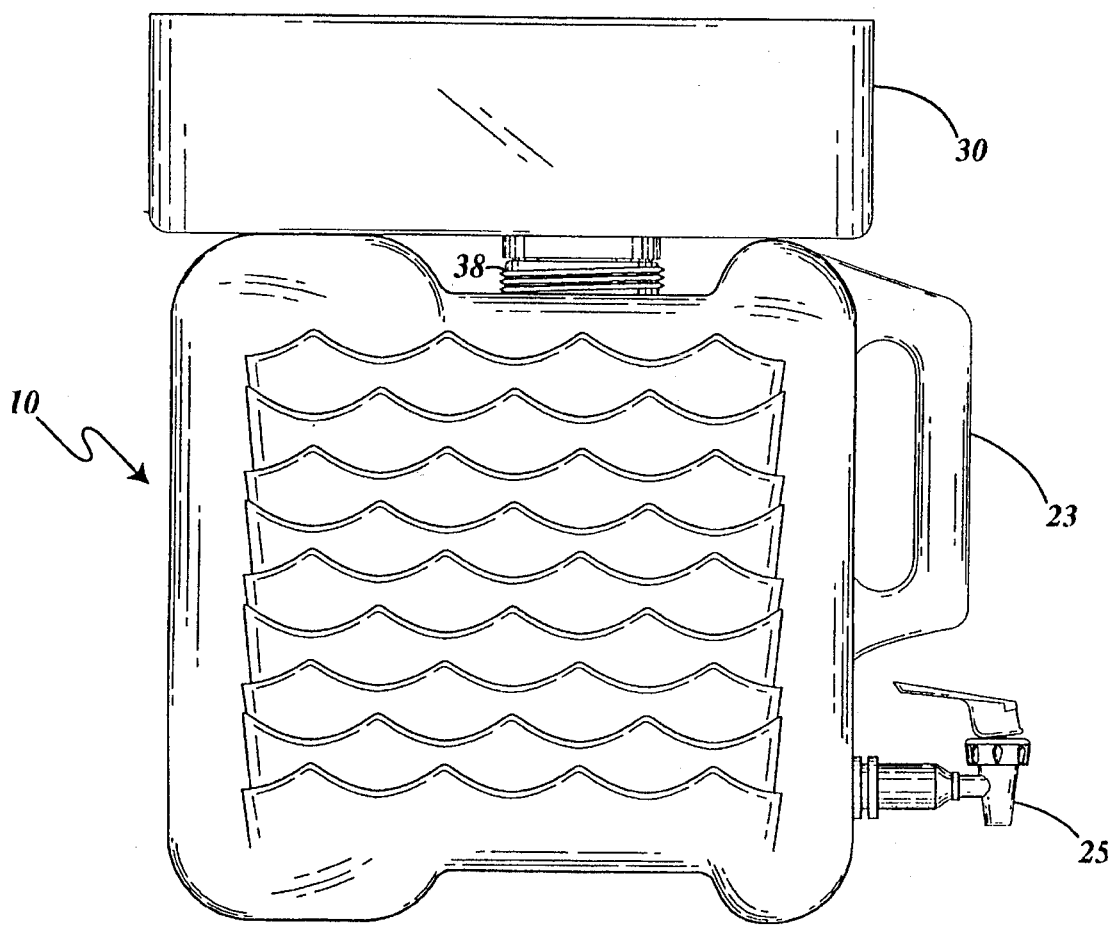
FIG. 2 is a side view with the funnel and filter cartridge in place for preparing a batch of filtered water.

FIG. 2 is a side view showing the funnel/reservoir 30 resting atop the container 10 with the conically tapered spout 38 of the funnel inserted into the fill opening 21 of the container. When water is poured from the tap into the funnel/reservoir 30, it will flow by gravity into the cup-like collar 67 of the filter cartridge 50 and flow through the hole 65 in the cup 55 to then percolate through the carbon filter media, be it a particulate or a solid block. The water must permeate through the filter media and exit the openings 54 before it can flow into the container 10.

Figure 3:
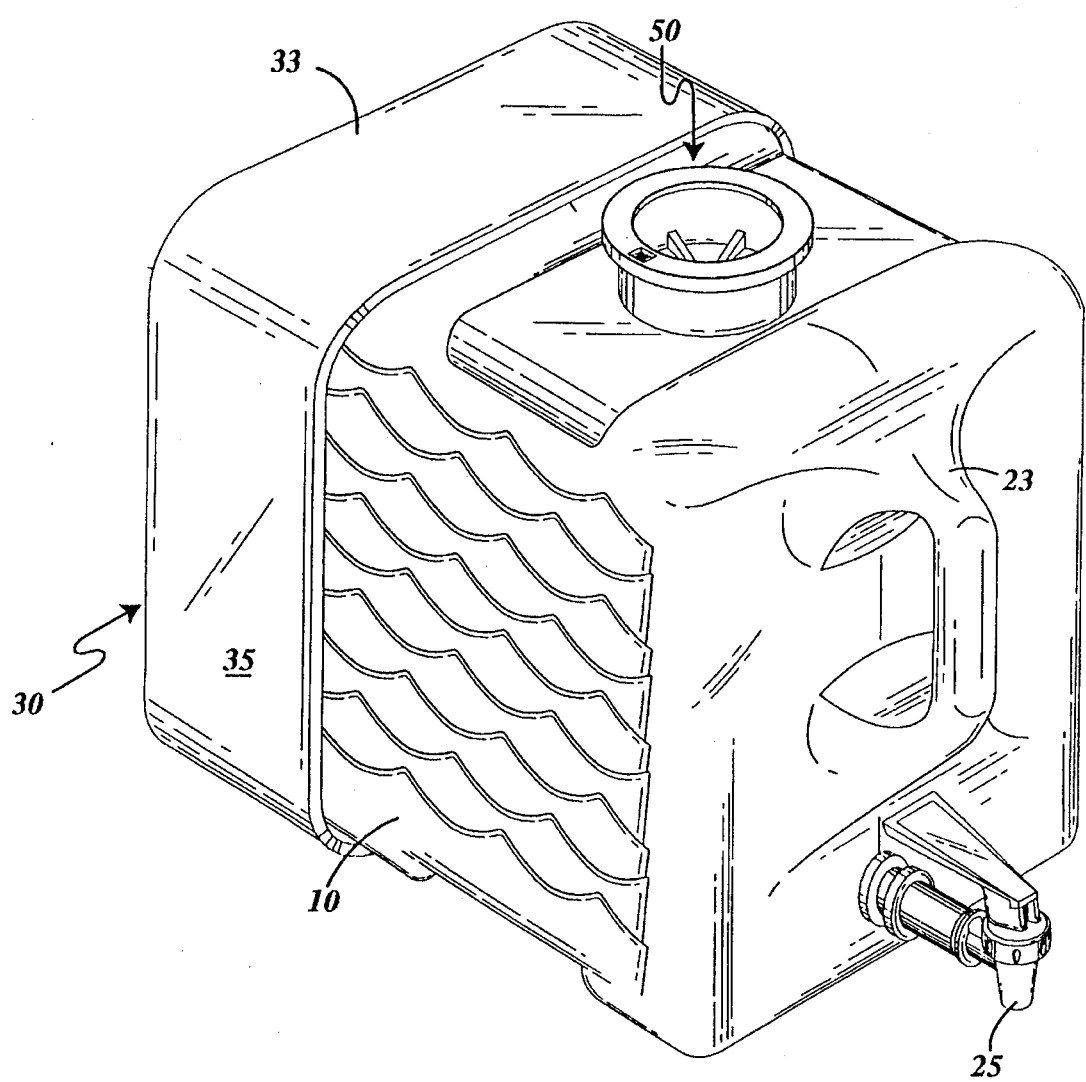
FIG. 3 is a perspective view of the kit when being stored between uses.

Referring next to the perspective view of FIG. 3, there is illustrated the manner in which the funnel and container can readily be stored between uses. It is to be particularly noted that the rectangular opening defined by the mutually perpendicular side walls 32, 33, 34 and 35 of the funnel/reservoir is such that the first end 16 of the container can be fitted into the reservoir portion of the funnel with a slight friction fit. As such, it will adhere to, but be easily removable from, the container. This assures that the components of the kit will be maintained together and readily available the next time the unit is to be used in preparing a batch of filtered water.

The filter cartridge of FIG. 4 is likewise dimensioned to appropriately fit within the well 36 formed in the funnel reservoir 30 and with the lower base 53 disposed within the confines of the container. Water filling the reservoir must pass through the opening 65 in the cap and percolate through the filter paper barrier 64, the filter media filling the cup 52 and the filter paper barrier 63 before exiting the openings 54 in the lower base of the cartridge.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A water filtration kit, comprising:
   (a) a hollow, plastic container having a predetermined shape profile defining a base and a top joined by a first, second, third, and fourth mutually perpendicular and generally planar side walls, the top having an opening formed therein, the opening being surrounded by an outwardly projecting neck, the first side wall having an integrally molded threaded outlet port located adjacent the base;
   (b) a spigot valve connected to the threaded valve outlet port;
   (c) a funnel/reservoir member comprising a reservoir having a bottom wall and four mutually perpendicular surrounding side walls defining an open top, the bottom wall of the funnel/reservoir member including a tubular collar surrounding an opening, the tubular collar providing means for engaged the neck on said container during use, the open top and four side walls of the funnel/reservoir member providing means for fitting over a predetermined portion of the base, top, second side wall, third side wall, and fourth side wall of the container with a friction fit during storage of the kit; and
   (d) a cup-shaped filter cartridge having generally closed first and second ends, except for at least one water inlet port in the first end and at least one water outlet port in the second end, the first and second ends of the filter cartridge being joined by a sidewall, the filter cartridge containing a filter media therein, the filter cartridge being substantially smaller in size than the container and being inserted into the tubular collar of the funnel/reservoir member so that the second end of the filter cartridge projects into the hollow plastic container when the collar on the funnel/reservoir member is in engagement with the neck on the container.

2. The water filtration kit as in claim 1 wherein the filter media includes carbon particles and the filter cartridge includes means for preventing the carbon particles from passing out from the interior of the cartridge through the at least one water inlet port and the at least one water outlet port.

3. The water filtration kit as in claim 1 and further including an integrally molded handle extending outwardly from the first side wall of the container.

4. The water filtration kit as in claim 3 wherein the handle extends outwardly from the first side wall of the container adjacent the spigot valve.

5. The water filtration kit as in claim 1 wherein the filter cartridge includes a manually operable indicator means for indicating a volume of water that has been passed through the water filtration medium.

6. The water filtration kit as in claim 5 wherein the indicator means comprises a dial having graphic symbols thereon and a member cooperating with the dial and having a window formed therethrough through which the symbols can be viewed when the member is rotated relative to the dial.

7. The water filtration kit as in claim 1 wherein the cup-shaped filter cartridge includes diverter means for engaging the sidewall thereof intermediate the first and second ends for redirecting the flow of water seeping along the sidewall of the cup-shaped filter cartridge to a central portion thereof.

8. The water filtration kit as in claim 7 wherein the diverter means comprises a flat washer having a circular aperture formed at the center thereof to allow water to flow therethrough.

9. A water filtration kit, comprising:
   (a) a hollow, plastic container having the form of a generally rectangular parallelepiped having a top wall with an opening formed therein, said opening being surrounded by an integrally molded threaded neck, a bottom wall, and first and second parallel end walls extending between the top and bottom walls, said first end wall including an integrally molded, threaded outlet port disposed proximate the bottom wall;
   (b) a spigot valve connected to the threaded outlet port;
   (c) a funnel/reservoir member comprising a reservoir having four mutually perpendicular side walls projecting outwardly from a bottom wall to define an open top, the bottom wall including an integrally molded collar surrounding an opening, the collar providing means for engaging the threaded neck on the container during use, the open top and four side walls providing means for fitting over the second end wall and a portion of the top and bottom walls the container therein with a predetermined friction fit during storage; and
   (d) a filter cartridge comprising a cup containing a water filtration medium therein, the cup including first and second bases joined by a sidewall, the first and second bases each including a pattern of holes formed therethrough through which water can pass, the first base being surrounded by an annular flange supported by a portion of the bottom wall of the funnel/reservoir member surrounding the opening in the bottom of the funnel/reservoir member with the second base being disposed within the container.

10. The water filtration kit as in claim 9 wherein the filter cartridge includes a manually operable indicator means for indicating the volume of water that has been passed through the water filtration medium, the indicator means comprising a dial having graphic symbols thereon and a covering member having a window formed therethrough through which the symbols can be viewed when the covering member is rotated relative to the dial.

11. The water filtration kit as in claim 9 wherein the filter cartridge includes diverter means engaging the sidewall of the cup intermediate the first and second bases for redirecting the flow of water seeping along the sidewall of the cup to a center portion of the cup.

12. The water filtration kit as in claim 9 wherein the water filtration medium includes carbon particles and the cartridge further includes means for preventing the carbon particles from passing through the pattern of holes formed through the first and second bases.

* * * * *

UNITED STATES PATENT AND TRADEMARK OFFICE
CERTIFICATE OF CORRECTION

PATENT NO. : 5,536,396
DATED : July 16, 1996
INVENTOR(S) : Mark R. Mudra, et al.

It is certified that error appears in the above-indentified patent and that said Letters Patent is hereby corrected as shown below:

Column 5, line 36, change "engaged" to -- engaging --.

Column 6, line 37, after "walls" insert -- of --.

Signed and Sealed this

Fifteenth Day of October, 1996

Attest:

BRUCE LEHMAN

Attesting Officer          Commissioner of Patents and Trademarks